April 2, 1940.  H. L. MOHR ET AL  2,195,750
PHOTOGRAPHY
Original Filed Nov. 13, 1936   2 Sheets-Sheet 1
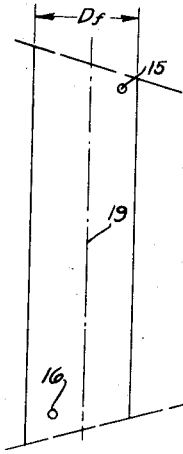
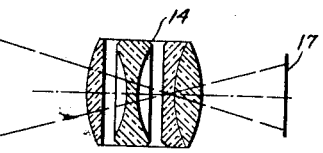
FIG.1.
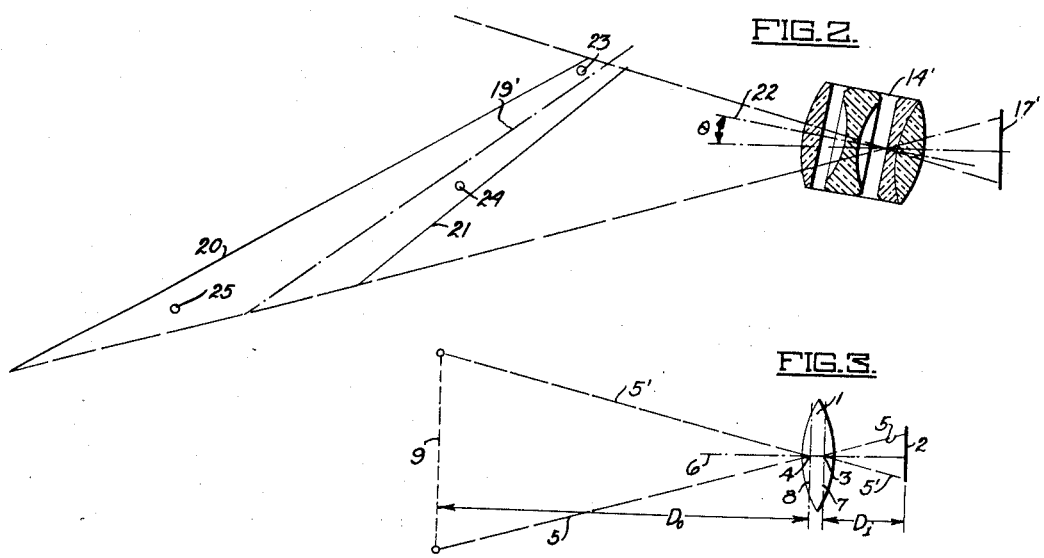
FIG.2.
FIG.3.
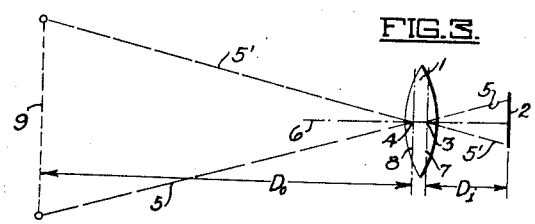
FIG.4.
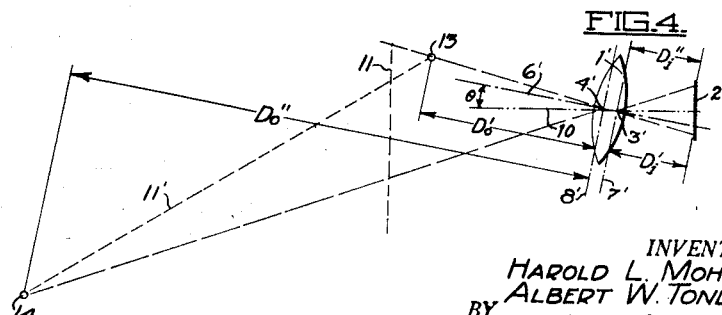
INVENTORS
HAROLD L. MOHR
ALBERT W. TONDREAU
BY W. E. Beatty
ATTORNEY April 2, 1940.  H. L. MOHR ET AL  2,195,750
PHOTOGRAPHY
Original Filed Nov. 13, 1936  2 Sheets-Sheet 2
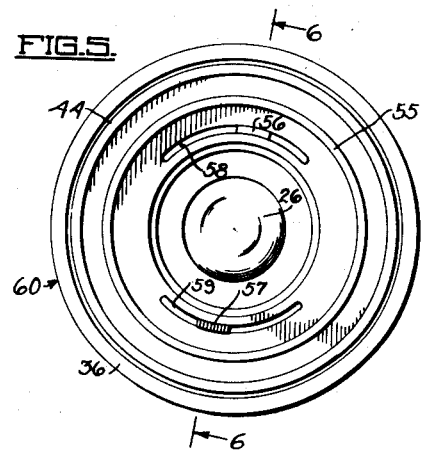
Fig. 5.
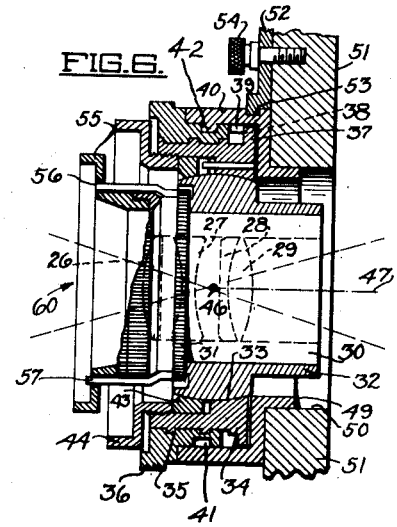
Fig. 6.
Fig. 7.
Fig. 8.
INVENTORS.
HAROLD L. MOHR
ALBERT W. TONDREAU
BY W. E. Beatty
ATTORNEY Patented Apr. 2, 1940

2,195,750

UNITED STATES PATENT OFFICE 2,195,750

PHOTOGRAPHY

Harold L. Mohr, Hollywood, and Albert W. Tondreau, Glendale, Calif., assignors to Warner Brothers Pictures, Inc., Burbank, Calif., a corporation of Delaware Original application November 13, 1936, Serial No. 110,705. Divided and this application May 14, 1938, Serial No. 207,960

3 Claims. (Cl. 88—16)

This invention relates to the art of photography and more particularly to a method of modifying the depth of field of a camera lens, within certain limits, to correspond with the depth of the object field to be photographed.

As is well known in the art of photography, the lens, film and/or the object field to be photographed are moved relatively to each other and along an axis passing therethrough until the image formed upon the film is in focus. Assuming the lens to be corrected for a flat field, as is usually the case, then theoretically, in order to place all points of the image on the film in sharp focus, all points in the object field should lie in a single plane, commonly termed the focal plane. Actually, however, a portion or portions of the object field may occupy a position or positions, in front of and/or behind the focal plane, within certain limits, without a noticeable distortion due to improper focus, these limits defining what is termed the depth or field of focus. That is to say, a point in the object field may be moved within specified limits without producing an objectionable distortion of the image upon the film. This depth of focus is, to some extent, an arbitrary amount depending on the type of photography or the amount of allowable image distortion on the film. In most cases of photography, it is practically impossible to place all of the object field within these certain specified limits. Therefore, more or less of the image upon the film will be out of focus. Generally the camera lens is so focused that the image of the main portion of the object field forming the center of interest will be in sharp focus, allowing the rest of the field, such as the background, to lack detail or definition.

Attempts, heretofore made, to increase the allowable depth of focus, so as to include more of the object field, have generally comprised either making the lens aperture smaller, thus sacrificing a considerable amount of photographing light and requiring longer exposure, or increasing the distance between the camera and the object field so as to take advantage of the fact that the allowable depth of focus increases as the object distance from the camera increases.

The problem of obtaining correct focus is much greater in the case of photographing than in projection where attempts have been made to avoid a keystone effect of a picture projected on a screen due to the angle between the screen and the optical axis of the projector, by displacing the lens in relation to the film. In the case of a projector, the object (the film) and the image forming surface (the screen) both constitute flat planes. However, in photography, although the image forming surface, i. e., the film, constitutes a flat plane, the object in nearly all cases has considerable depth. Also, in the past few years, wide aperture lenses have increased in popularity due to allowing an increase in the allowable shutter speeds, increase in light admitted to the film, etc. These lenses, however, require a much more critical control of focus than heretofore, due to the fact that the allowable depth of focus is decreased in proportion to the increase in lens opening.

It is seldom that the object field or an average plane passing therethrough is exactly normal to the optical axis of the photographing camera. While it may be possible at times to so locate the camera that its optical axis does lie normal to the average plane of the object field, it is sometimes desirable to locate it otherwise to obtain certain artistic effects, or to portray certain important portions of the object field more clearly, etc. Further, it may be impossible to locate the optical axis normal to the average object plane, as for example, when photographing a high building or structure from a point in close proximity thereto.

One object of the present invention is to obtain, on a photographic film in a camera, a sharp image of an object field, the average plane of which is not normal to the optical axis of the camera. This is accomplished before or preferably after the usual focusing movement of the objective lens along the optical axis of the camera, by tiltably adjusting the lens only toward the nearer portion of the object field so that its optical axis forms an angle with the axis of the camera proper. Preferably, the lens is tilted about the rear nodal point thereof adjacent the film so as to obtain a minimum amount of image sweep across the plane of the photographing film during such tilt adjustment. It will be explained later how this tilt adjustment serves to conform the depth of field of the lens, to the depth of an object field which is asymmetrical to the optical axis of the camera.

Under actual photographing conditions the average plane passing through an object field may assume any of a variety of angular positions in respect to the camera. For example, as in photographing a tall building from a point close thereto, the object plane may incline vertically away from the camera, while, as in the case of photographing a road or highway with the optical axis of the camera forming an acute angle with the road, the object plane may incline horizontally away from the camera. Furthermore, conditions may arise wherein the object plane may incline both horizontally and vertically away from the camera.

Although the invention may be advantageously practiced with all types of lenses, it is particularly valuable when used with wide aperture lenses wherein the allowable depth of field is small.

The present application is a division of our co-pending application Serial No. 110,705, filed November 13th, 1936, now Patent No. 2,177,737 which discloses and claims the lens mount and adjustment disclosed herein.

More particularly describing the invention, reference may be had to the accompanying drawings wherein:

Fig. 1 is a diagrammatic view showing the object field, the objective lens combination, and the film forming the essential parts of a conventional photographic apparatus.

Fig. 2 is a diagrammatic view of the elements of Fig. 1 wherein the objective lens is adjusted about one of its nodal points in an angular relation to the optical axis of the camera proper so as to photograph in focus an object field, the average plane of which forms an angle with the film.

Figs. 3 and 4 are diagrammatic views similar to those of Figs. 1 and 2 showing the relationship between the object field and the image plane.

Fig. 5 is a front view of a preferred form of objective lens mount.

Fig. 6 is a sectional view of the objective lens mount and is taken along the line 6—6 of Fig. 5.

Fig. 7 is a front view of the objective lens mounted within a sound proof casing or blimp and showing external adjusting means therefor.

Fig. 8 is a sectional elevation view through the blimp and motion picture camera associated with our new objective lens and is taken along the line 8—8 of Fig. 7.

As is well known in the art of photography, a lens or combination of lenses has a pair of nodal points through which the light rays from an object field and incident upon the center of the lens apparently cross. Rotation of the lens or lens combination about the emergent nodal point, that is the point adjacent the image forming plane, will not produce a noticeable shift of the image transversely of the film when the lens is focused upon an object.

Referring to Fig. 3 the essential parts of a camera are diagrammatically indicated, i. e., a lens 1 and film 2. Lens 1, although usually comprising a combination of simple corrected lens elements, is shown in the form of a single lens for the sake of clearness. A pair of nodal points are shown at 3 and 4, through which rays of light 5 and 5' from an object field and incident upon the center of the lens 1 apparently cross. That is, any ray, for example 5, upon striking the center of the lens 1 may be considered as passing through the front nodal point 4 where it is deflected in a path along the optical axis 6 of the lens until it reaches the rear nodal point 3. Here the ray 5 is again deflected and emerges from the lens 1 in a path parallel to but somewhat offset from its original path. The rear nodal point 3 adjacent the film, in the case of a camera or other photographic apparatus, is generally termed the nodal point of emergence.

According to the law of conjugate foci $$\left(\frac{1}{F} = \frac{1}{D_i} + \frac{1}{D_o}\right)$$

having known the focal length (F) of the lens 1 and the image distance $D_i$ between film 2 and a principal plane 7 passing through the rear nodal point 3 at right angles to the optical axis of the lens, the object distance $D_o$ may be determined. The object distance in this instance, is measured between a principal plane 8 passing through the front nodal point 4, parallel to plane 7, and the object plane 9.

According to the present invention the lens 1' (Fig. 4) is tilted about its rear nodal point 3' so that its optical axis 6' forms an angle $\theta$ with the optical axis 10 of the camera proper so as to shift the object plane 11 to a position 11' lying at an angle with the film 2'. The plane 11' may be made to assume a wide variety of slopes depending on the angle $\theta$ of tilt of lens 1' whereby it may be made to conform with a plane passing through an object field or at least a plane passing through the main points of interest in that field. In adjusting the lens 1' so as to bring two objects, as at 13 and 14 in the object field, in focus upon the film 2', the lens 1' is preferably focused first in the usual manner by tilting it about its nodal point 3' until its optical axis 6' coincides with the optical axis 10 of the camera proper, and then moving it along its optical axis until it is focused somewhere between the two objects 13 and 14. Lens 1' is then tilted about point 3' until the respective object and image distances $D_i'$, $D_o'$ and $D_i''$, $D_o''$ for the objects 13 and 14, respectively, satisfy the formula $$\frac{1}{F} = \frac{1}{D_i} + \frac{1}{D_o}$$

or in other words until $$\frac{1}{D_i'} + \frac{1}{D_o'} = \frac{1}{D_i''} + \frac{1}{D_o''}$$

In the above cases the object and image distances are measured parallel to the optical axis 6' of the lens 1'. We have found it preferable to first focus the camera objective lens upon the closer object or point in the object field, or a short distance beyond and then tilt the lens until its plane of focus coincides with the object field or average plane passing therethrough, while the camera remains fixed.

Although the plane of focus or portion of the object field in focus as shown at 19, 19', 9 and 11' of Figs. 1, 2, 3 and 4, respectively, has been assumed to be a straight line, this portion actually comprises an area commonly termed the depth of field or depth of focus which extends on either side of the theoretical plane of focus. This depth of focus as defined by the dimension $D_f$ of Fig. 1 is an arbitrary amount determined by the type of photography, the lens aperture or opening, the amount of allowable out-of-focus distortion allowable on the film, etc. Also, this depth of focus $D_f$ depends on the distance of the object field from the objective lens 14 of the camera, that is, the allowable depth of focus increases as the object distance increases. With an object field having a depth of field $D_f$, objects as at 15 and 16 may be moved anywhere within this dimension without throwing the images of these objects out of focus to a noticeable extent upon the film 17 placed in juxtaposition with lens 14. When the objective lens 14' (Fig. 2), similar to that of Fig. 1, is tilted so that its optical axis 22 forms an angle $\theta$ with the optical axis 18 of the camera, the depth of focus increases on either side of the focal plane 19' as the distance from the lens to the plane 19' increases. Thus any objects such as 23, 24 and 25 at different distances from the lens 14', but all lying between the lines 20 and 21 defining the allowable depth of focus, may all be brought to proper focus upon film 17'

Figs. 5 and 6 show a preferred form of lens mount generally indicated at 60. The objective lens combination comprises, in this case, a number of lens elements 26, 27, 28 and 29, provided in a lens casing 30. An adjustable lens iris (not shown) is provided within the casing 30 and is adapted to be adjusted by a rotatable adjusting ring 31 to vary the diameter of the lens opening or aperture. A lens holding sleeve or member 32 carries the lens casing 30 and is provided with an enlarged convex spherical bearing portion 33 preferably concentric with the rear nodal point 46 of the lens combination. This bearing portion 33 engages a mating concave bearing portion formed on the inner surface of a lens bearing sleeve member 34. Member 34 has a set of screw threads 35 on its outer circumference which is engaged by similar internal threads on a focusing ring 36. A flange 37 on sleeve member 34 has a groove 38 extending therethrough which is adapted to engage and slide along a tongue 39 formed integral with and extending longitudinally within a shell 40. The focusing ring 36 has an annular groove 41 formed on the outer circumference thereof, which is engaged by a tongue or pin 42 extending within the shell 40. A focusing scale (not shown) may be provided on the outer circumference of the focusing ring 36 to indicate the focal distance of the lens when the optical axis of the lens coincides with the optical axis of the camera. A friction ring 43 having a concave bearing portion on the inner surface thereof, is also adapted to engage the convex portion of member 32. Preferably the convex portion 33 comprises an equatorial section as shown, while the concave member 34 engages member 33 on one side of the equator of member 33, the concave ring 43 engaging the convex member 33 on the other side of the equator of the member 33. A lock ring 44 threadably mounted within sleeve member 34 is adapted to engage friction ring 43 and thus frictionally lock the objective lens combination in any angular position about the rear nodal point 46 thereof. By rotating the focusing ring 36, the sleeve member 34 carrying the objective lens combination may be moved in and out in a direction parallel with the optical axis 47 of the camera proper. Shell 40 has a reduced end portion 49 which is adapted to be inserted within an annular aperture 50 formed in a front wall member 51 of a camera (not shown). A locking piece 52 engages a notch 53 formed on the shell 40 and is clamped to the wall member 51 by means of a locking screw 54. An extending ring member 55 secured to the forward end of the lens casing 30 is provided to allow convenient tilt adjustment of the lens combination about its rear emergent nodal point 46. A pair of diametrically disposed fingers 56 and 57 secured to the iris adjusting ring 31 extend forwardly through slots 58 and 59 respectively (Fig. 5) formed in ring member 55 so as to allow for exterior adjustment of the lens iris.

In Figs. 7 and 8 the preferred lens mount generally indicated at 60' is shown as being secured upon a motion picture camera 61 which in turn is mounted within the sound proof casing or blimp, a portion of which is indicated at 62. The shell 40' of lens mount 60', in this case, is attached to a lens turret wall 64. Wall member 64 is rotatably mounted by means of a tongue and groove arrangement 65 formed within a forward portion of a camera casing 66 to allow other lenses (not shown) which may be carried on member 64 to be brought into position before the photographing film. Apertures 67 in the forward wall portion of the camera casing 66 allow light passing through the objective lens 60' to expose successive frames of a sensitized motion picture film 68. Film 68 is adapted to be intermittently advanced past the aperture 67 by means of a conventional intermittent movement such as is generally indicated at 69. The rotatable focusing ring 36' of lens mount 60' is provided with a set of gear teeth 70 adapted to mesh with a spur gear 71 secured to a stub shaft 72. Shaft 72 is rotatably mounted within bearings 73 and 74 formed integrally with a frame or channel member 76 suitably supported in any manner (not shown) by the camera 61 or blimp 62. A worm gear 78 also secured to the stub shaft 72 is adapted to be engaged by a worm 79 meshing therewith. Worm 79 is actuated by a suitable connection (not shown) from the exterior of the blimp 62, thus allowing the objective lens to be remotely focused by the camera operator from the outside of blimp 62.

We will now describe the means for angularly adjusting the objective lens with respect to the optical axis of the camera proper, or in other words, with respect to an axis passing through a frame of the film 68 perpendicular thereto. The forward wall 81 of blimp 62 has a glass window 82 mounted within an aperture therein by means of clamping rings 83 and 84 to allow rays from the object being photographed to reach the film 68. A circular ring member 85, concentric with the optical axis of the camera is slidably mounted for rotation within a recess 86 formed on the exterior of wall member 81. A bushing 87 extending through an aperture in ring member 85 is secured thereto by a locking nut 88 and extends through an arcuate slot 89 formed through the wall 81 concentrically about the optical axis of the camera. Preferably this arcuate slot 89 extends through an angle of at least 180° to allow bushing 87 to be carried in a semi-circular path around the optical axis of the camera. A sleeve member 90 slidably mounted in the bushing 87 carries at its rear end a downwardly extending bifurcated yoke 91 having elongated slots 92 and 93 (Fig. 7) formed in each of the bifurcated portions 94 and 95 thereof, respectively. An arm 97 is secured to the outer portion of the ring 55' and has a pair of transversely extending pins 98 and 99 which are adapted to be guided within the slots 92 and 93, respectively. The upper end of arm 97 is bifurcated, the bifurcated portions of which have elongated slots 100 and 101 provided therein. A lens tilt adjusting pin 102, slidably mounted within sleeve member 90, carries at its rear end a pair of transversely extending pins 103 and 104. Pins 103 and 104 are adapted to slide within the slots 100 and 101, respectively. Suitable indicating indicia 106 are provided on pin 102 to indicate the angle at which the objective lens combination is tilted about the optical axis of the camera 61.

The objective lens may be tilted an equal amount on either side of the optical axis of the camera 61 by the pin 102. Thus, although the slide member 85 is limited in rotation to an angle less than 360° a point on the optical axis of the objective lens may be made to describe a complete circular path of 360° to allow the focal plane of camera 61 to assume any angle with the optical axis thereof.

In photographing a scene in which the object field varies in distance from the camera, the circular slide member 85 having indicia 107, preferably marked in degrees, is rotatably adjusted until the correct azimuth of tilt of the objective lens or, in other words, the correct angular position of the axis about which the objective lens is tilted is provided for the particular object field to be photographed. The optimum position of the tilt axis is obtained when it is placed at right angles to a line, lying in the average object plane, which forms the greatest angle with the film. A focusing knob 109 formed on the end of the lens adjusting pin 102 is moved in or out until the correct angle of the lens indicated by the indicia 106 is determined.

The sleeve member 90 forms a compensating connection to compensate for movement of the ring 55′ along the optical axis of camera 61 due to focusing of the lens combination. The objective lens, when moved outwardly through the longitudinal focusing adjustment thereof, causes a similar movement of the sleeve 90 in the same direction. The indices 106 formed on pin 102 are read in reference to the compensated forward edge of bushing 90. In adjusting the objective lens in a position forming an angle below the optical axis of the camera, the lens adjusting knob 109 is pulled outwardly until the optical axis of the objective lens itself moves in a plane across the optical axis of the camera proper and therebelow.

When the lens mount 60 is employed with a motion picture camera, the mount may be angularly adjusted, for the purpose above set forth, during the photographing of a set or scene. Thus the objective lens of the camera may be made to properly focus upon the motion picture film an object field whose distance from, or whose position with respect to the camera changes in whole or in part during the photographing thereof. In other words, the lens may be tilted to obtain improved depth of focus of the principal objects in a scene while making a "pan" and "dolly" shot of the scene.

Having thus described the invention, what is claimed as new and desired to be secured by Letters Patent is:

1. The method of simultaneously photographing a plurality of objects at different distances from a camera having an objective lens and a sensitized surface in juxtaposition with said lens and wherein the separation of said objects along the optical axis is wider than the depth of focus when said axis bisects the angle of view, which comprises directing said camera toward said objects, moving said lens along the optical axis of said camera for focusing, angularly adjusting a tilt axis for said lens through the emergent nodal point thereof, tilting said lens about said adjusted tilt axis relatively to said camera without tilting said sensitized surface with respect to said camera to shift the depth of focus of said objective lens to embrace said objects and thereafter light impressing said sensitized surface with the images of said objects while said lens is thus adjusted.

2. The method of simultaneously photographing an object field having a plurality of separate objects at different distances from a camera having an objective lens and a sensitized film and wherein the separation of said objects along the optical axis is wider than the depth of focus when said axis bisects the angle of view, which comprises directing said camera toward said object field with the portion of said film at the optical axis substantially out of parallelism with the average plane of said field, moving said lens along the optical axis of said camera for focusing, angularly adjusting a tilt axis for said lens through the emergent nodal point thereof, thereafter tilting said lens about said adjusted tilt axis towards the nearest portion of said object field, without tilting said sensitized film with respect to said camera, to approximately conform the depth of focus of said lens to the object field and thereafter light impressing said sensitized film with images of said objects while said lens is thus tilted.

3. The method of cinematographing an object field by a motion picture camera having an objective lens and means for traversing a motion picture film in juxtaposition with said lens, and wherein said object field comprises objects outside the depth of focus when the optical axis of said camera bisects the angle of view and wherein said object field moves relatively to said camera during cinematographing, which comprises directing said camera toward said field, moving said lens along the optical axis of said camera for focusing, angularly adjusting a tilt axis for said lens through the emergent nodal point thereof, and moving said camera during cinematographing to maintain the image of said relatively moving field on said film while tilting said lens about said adjusted tilt axis to approximately maintain said object field embraced within the depth of focus of said lens during cinematography of said moving object field.

HAROLD L. MOHR.
ALBERT W. TONDREAU.